(12) United States Patent
Taniguchi

(10) Patent No.: US 6,339,669 B1
(45) Date of Patent: Jan. 15, 2002

(54) PICTURE-REPRODUCING APPARATUS

(75) Inventor: Atsushi Taniguchi, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/379,099

(22) Filed: Aug. 23, 1999

(30) Foreign Application Priority Data

Aug. 28, 1998 (JP) ............................................ 10-244048

(51) Int. Cl.[7] .............................................. H04N 5/91
(52) U.S. Cl. ........................ 386/68; 386/109; 386/125
(58) Field of Search ............................ 386/33, 45, 46, 386/68, 111, 112, 125–126, 102, 82, 81, 80, 8, 95, 109; H04N 5/91

(56) References Cited

U.S. PATENT DOCUMENTS

| | | | |
|---|---|---|---|
| 4,907,070 A | * | 3/1990 | Wesolowski ................. 386/90 |
| 5,019,906 A | * | 5/1991 | Wesolowski ................. 386/85 |
| 5,592,299 A | * | 1/1997 | Boyce et al. ................. 386/68 |
| 5,740,304 A | * | 4/1998 | Katsuyama et al. .......... 386/46 |
| 5,784,527 A | * | 7/1998 | Ort .............................. 386/111 |
| 5,923,627 A | * | 7/1999 | Miwa et al. .................. 386/70 |

FOREIGN PATENT DOCUMENTS

| | | |
|---|---|---|
| JP | 57-73578 | 5/1982 |
| JP | 5-236429 | 9/1993 |
| JP | 06301360 A | 10/1994 |
| JP | 07226903 A | 8/1995 |
| JP | 07284067 A | 10/1995 |
| JP | 09326991 A | 12/1997 |

* cited by examiner

Primary Examiner—Vincent F. Boccio
(74) Attorney, Agent, or Firm—Whitham, Curtis & Christofferson, P.C.

(57) ABSTRACT

Disclosed is a picture-reproducing apparatus comprising: read-in circuit 2 for reading picture codes and an automatic pause trigger bit from each sector on record medium 1 and, if the automatic pause trigger bit is active, setting AP_FLG 7; a code-inserting circuit 8 for inserting trigger detection code into picture codes when detecting that the automatic pause trigger bit is active by AP_FLG 7; buffer 3 for storing picture codes; core decoder 9 for reading picture codes from buffer 3, decoding picture data from the picture codes and, if trigger detection code is detected, setting trigger information of a frame in picture memory 11; picture memory 11 for storing picture data and the trigger information; transfer control circuit 11 for reading the picture data and the trigger information in display sequence and outputting the picture data to display circuit 5; and display circuit 5 for displaying picture data. If transfer control circuit 10 detects the trigger information is active, it outputs a halt-requesting signal to core decoder 9 and to read-in circuit 2 via core decoder 9 and halts outputting picture data. Read-in circuit 2 and core decoder 9 halt when they input the halt-requesting signal. When picture data is not inputted, display circuit 5 displays picture data of the preceding frames in a freeze mode.

15 Claims, 17 Drawing Sheets

FIG.4

| start_code | CODE |
|---|---|
| picture_start_code | 0000_0100 |
| slice_start_codes | 0000_0101 |
| | ⌇<br>0000_01AF |
| reserved | 0000_01B0 |
| reserved | 0000_01B1 |
| user_data_start_code | 0000_01B2 |
| sequence_header_code | 0000_01B3 |
| sequence_error_code | 0000_01B4 |
| extension_start_code | 0000_01B5 |
| reserved | 0000_01B6 |
| sequence_end_code | 0000_01B7 |
| group_start_code | 0000_01B8 |
| system_start_code | 0000_01B9 |
| | ⌇<br>0000_01FF |

PICTURE-REPRODUCING APPARATUS

BACKGROUND OF THE INVENTION

1. Field of the Invention

The present invention relates to a picture-reproducing apparatus and particularly, to the picture-reproducing apparatus which reproduces a moving picture from picture codes recorded on a record medium and has an automatic pause function.

2. Description of the Prior Art

Heretofore, technologies for effectively compressing a moving picture or a still picture in digital has been standardized. FIG. 12 shows a relationship between a sequence of decoding a moving picture from picture codes complying with MPEG-1 standard (ISO/IEC-11172) and a sequence of displaying the moving picture. In FIG. 1, I frame (intra picture) is decoded from only picture codes in the I frame itself. P frame (predictive picture) is reproduced from picture data in a preceding I frame if necessary and picture codes in the P frame itself. B frame (bidirectionally predictive picture) is reproduced from picture data in a preceding I frame or P frame if necessary, picture data in succeeding I frame or P frame if necessary, and picture codes in the B frame itself. P4 frame is reproduced from picture data in I1 frame if necessary and picture codes in P4 frame. B2 and B3 frames are reproduced from picture data in I1 frame if necessary, picture data in P4 frame if necessary, and picture codes in B2 and B3 frames, respectively. The display sequence has a order of I1, B2, B3, P4, and so forth. However, because frames B2 and B3 must be decoded using already decoded frame P4, frame P4 need to be decoded before frames B2 and B3. Therefore, the decode sequence must has a order of I1, P4, B2, B3, and so forth.

FIG. 13 is a diagram showing a relationship between a variation of the amount of picture codes in a buffer and frame types. According to the MPEG standard, compression method varies among frame types. Therefore, there is a tendency that an I frame which is decoded from picture codes in the I frame itself heavily consumes codes, whereas a B frame which is reproduced while using picture data of preceding I or P frame if necessary, picture data of a succeeding I or P frame if necessary lightly consumes picture codes. In order to simultaneously read picture codes from a recording media at a constant rate and execute a moving picture-decoding process in which the amount of consumed picture codes varies dependently on picture type, there is desired a picture code buffer which never overflows nor underflows. In addition, according to the MPEG standard, the amount of picture codes which should be stored in a picture code buffer at the time when the decoding of the first frame begins is described in "vbv delay " in a picture layer as shown in FIG. 10. Decoder needs to start decoding at the time when a picture code buffer has stored the amount of picture codes designated by "vbv delay" to prevent such phenomenon in which the picture code buffer underflows, the decoding operation of the decoder is halted, and the temporal continuity of the displayed picture breaks.

Among standards by which moving picture data are compressed in conformity with the MPEG standard or the CDROM-XA (Compact Disc Read Only Memory Extended Architecture) standard and then recorded on a compact disc having a sector structure is the Video CD standard. In the Video CD standard, there is provided an automatic pause function. In accordance with the automatic pause function, once a frame including a sector whose trigger bit for the automatic pause function (hereinafter referred to as "an automatic pause trigger bit") is active is decoded and displayed, the frame will be kept displayed in a freeze mode until the pause is released. In accordance with the structure of a sector defined by CDROM-XA Forum 2 as shown in FIG. 14, the automatic pause trigger bit is recorded in an automatic pause trigger bit area of Submode area of the sub header of a sector, and picture codes are grouped into sectors and recorded in a plurality of User Data areas.

As a prior art reference, JPA 07-226903 discloses an apparatus for realizing the automatic pause function.

FIG. 11 is a block diagram of the conventional picture-reproducing apparatus in the prior art reference. Referring to FIG. 11, the conventional picture-reproducing apparatus comprises: read-in circuit 32 which reads picture codes in User Data areas from recording media 31, which has a Submode area and User Data area in a structured sector, and writes the picture codes to buffer circuit 33; buffer circuit 33 which temporally stores the picture codes written by read-in circuit 32 and outputs the stored picture codes to decoder 34; decoder 34 which decodes picture data from the picture codes inputted from buffer circuit 33 and outputs the picture data to display circuit 35; and display circuit 35 which displays the picture data inputted from decoder 34.

The picture codes which are necessary to decode a single frame are recorded in the User data areas of a plurality of sectors dividedly. If there is a frame which is desired to be displayed in a freeze mode by automatic pause function, an active automatic pause trigger bit is recorded in a Submode of the last sector for the frame.

Next, the operation of read-in circuit 32 is explained hereunder with reference to FIG. 15.

At the beginning, read-in circuit 32 reads a Submode area at step S1501. Thereafter, read-in circuit 32 reads picture codes in a User Data area at step S1502 and writes the picture codes to buffer circuit 33 at step S1503. Thereafter, read-in circuit 32 judges whether or not all the picture codes in a User Data area of one sector has been read at step S1504. If the result of the judgement is negative, the operation returns to step S1502, whereas if the result of the judgement is affirmative, the operation advances to step S1505. Therefore, operations at Steps 1502 and 1503 are repeated until all the picture codes in a User data area of one sector has been read. Thereafter, read-in circuit 32 judges whether or not the automatic pause trigger bit in the Submode area read at step S1501 is active at step S1501. If the result of the judgement at step S1505 is negative, the operation returns to step S1501 to read the next sector, whereas if the result of the judgement at step S1505 is affirmative, the operation finishes and the next sector will not be read.

Next, the operation of buffer circuit 33 is explained hereunder with reference to FIG. 16.

As explained above, the picture codes are sequentially written to buffer circuit 33 by read-in circuit 32. Buffer circuit 33 judges whether or not decoding one frame is executable, that is, all the picture codes for one frame has stored in buffer circuit 33 at step S1601. If the result of the judgement at step S1601 is affirmative, the operation advances to step S1602, whereas if the result of the judgement at step S1601 is negative, the operation halts and buffer circuit 33 resumes the operation from step S1601 after a lapse of a predetermined time. After the operation has advanced to step S1602, buffer circuit 33 repeats to outputs the picture codes in one frame to decoder 34 until all the picture codes in the frame has outputted to decoder 34 at step S1602 and S1603. After exiting the loop of step S1602 and S1603, the operation returns to step S1601.

Next, the operation of decoder 34 is explained hereunder with reference to FIG. 17.

When picture codes are inputted from buffer circuit 33, decoder 34 decodes one frame from the picture codes at steps S1701 through S1703. In addition, if there is a decoded frame which is displayable in accordance with the display sequence, decoder 34 outputs the picture data of the decoded frame to display circuit 35.

Display circuit 35 displays picture data of decoded frames which have been inputted from decoder 34. If the input of picture data from decoder 34 is halted, display circuit 35 continues to display the picture data of the last frame before the halt in a freeze mode until the picture data of the next frame are inputted.

Next, the operation of the whole of the conventional picture-reproducing apparatus shown in FIG. 11 is explained hereunder with reference to FIGS. 18 and 19.

Referring to FIG. 18, there is illustrated an example in which frame B5 is displayed in a freeze mode by the automatic pause function. When read-in circuit 32 detects that the automatic pause trigger bit in the last sector of frame B5 is active, read-in circuit 32 will not read the next sector after writing the picture codes in the User Data area of the last sector of frame B5 to buffer 32. Because writing picture codes to buffer circuit 33 by read-in circuit 32 is halted, as shown in FIG. 19 in which an example of a variation of the amount of the picture codes in conventional buffer circuit 33 is illustrated, when the last decodable frame to which the picture codes stored in buffer circuit 33 belong becomes frame B5, buffer circuit 33 outputs the picture codes of frame B5 to decoder 34, and when this outputting operation completes, because picture codes necessary to decode one frame are exhausted, buffer circuit 33 halts outputting picture codes to decoder 34. When having finished to decode frame B5, decoder 34 transfers picture data of frame B5 to display circuit 35 because it is just a time when frame B5 is displayable in accordance with the display sequence as shown in FIG. 18. When having finished to decode frame B5, because the picture codes of the next frame or frame B6 will not be inputted for a certain period, decoder 34 halts decoding operation and therefore, transfer of the picture data of the next frame to display circuit 35 is halted. Display circuit 35 displays frame B5 when the picture data of frame B5 are transferred thereto, and thereafter continues to display frame B5 in a freeze mode because the picture data of the next frame following frame B5 will not be transferred for the certain period. The above operation realizes the automatic pause function. When the automatic pause is released, picture codes necessary to decode one frame are not stored in buffer circuit 33 as shown in FIG. 19. Therefore, it is necessary to prolong the period before resuming decoding process until the amount of picture codes necessary for stable decoding operation is reached in buffer circuit 33 by writing operation to buffer circuit 33 by read-in circuit 32. That is, it is necessary to prolong such period until at least the picture codes of frame B6 are accumulated in buffer circuit 33. In the example shown in FIG. 19, the decoding process resumes when the picture codes of frame B6 and succeeding frames are accumulated.

FIG. 20 shows an example in which the automatic pause trigger bit in the last sector of frame P7 is active. When read-in circuit 32 detects that the automatic pause trigger bit in the last sector of frame P7 is active, read-in circuit 32 will not read picture codes of the next sector after having finished to write the picture codes in User Data area of the last sector of frame P7 to buffer circuit 33. Because writing picture codes to buffer circuit 33 by read-in circuit 32 is halted, when the last decodable frame to which the picture codes stored in buffer circuit 33 belong becomes frame P7, buffer circuit 33 outputs the picture codes of frame P7 to decoder 34, and when this writing operation completes, because picture codes necessary to decode one frame are exhausted, buffer circuit 33 halts outputting picture codes to decoder 34. When having finished to decode frame P7, decoder 34 transfers picture data of frame P4 to display circuit 35 because it is just a time when frame P4 is displayable in accordance with the display sequence. When having finished to decode frame P7, because the picture codes of the next frame will not be inputted for a certain period, decoder 34 halts decoding operation. At this time, because decoding frames B5 and B6 is not executed due to the halt of the decoding process, it is not possible to transfer the picture data of frames B5 and B6 to display circuit 35. Therefore, frames B5 and B6 which must be displayed before frame P7 in the display sequence are not displayed. Thus, it is not possible to transfer the picture data of frame P7 to display circuit 35 although frame P7 has decoded. Therefore, display circuit 35 displays frame P4 when the picture data of frame P4 are transferred thereto, and thereafter continues to display frame P4 in a freeze mode because the picture data of the frames B5 and B6 are not transferred though frame P7 should be displayed in a freeze mode originally.

The conventional picture-reproducing apparatus has disadvantages as follows:

(1) For an I frame or P frame which succeeds B frame(s) in the display sequence, the decode order differs from the display order. When the automatic pause trigger bit of such I or P frame is active, read-in circuit 32 does not read the picture codes of the succeeding B frame(s) in the decode sequence. Therefore, B frame(s) which should be displayed before such I or P frame are not decoded. Therefore, there is a disadvantage that it is not possible to display a picture in a freeze mode at an I or P frame having a sector whose automatic pause trigger bit is active. Therefore, if it is needed to display a picture in a freeze mode at an accurate frame, there arise a restriction that such I or P frame must be excluded from the frames having a sector whose automatic pause trigger bit is active.

(2) Buffer circuit 33 manages whether picture codes of a decodable frame are stored therein in order to output picture codes to decoder in frame unit. Therefore, buffer circuit 33 must have a function to perform a control in frame unit in addition to a function of temporal storage. Thus there is a disadvantage that buffer circuit 33 becomes complicated.

(3) When the automatic pause function is executed and a picture is displayed in a freeze mode, buffer 3 is halted without storing a sufficient amount of picture codes to decode even one frame. Therefore, even read-in circuit 32 starts it's operation to write picture codes to buffer circuit 33 just after release of the automatic pause, it is impossible to start decoding operation until a certain amount of picture codes necessary to perform decoding operation stable without underflow is reached in buffer circuit 33. Therefore, there is a disadvantage that it takes a time from releasing the automatic pause to displaying a picture of the next frame.

(4) Because the automatic pause function is triggered by a halt of writing operation of the picture codes of the next sectors to buffer circuit 33 by read-in circuit 32 and the halt is caused when read-in circuit 32 detects that an automatic pause trigger bit is active, there is a disadvantage that a sector whose automatic pause trigger bit is active must be located at the end of the frame to be displayed in a freeze mode or after such frame.

SUMMARY OF THE INVENTION

In order to overcome the aforementioned disadvantages, the present invention has been made and accordingly, has an object to provide a picture-reproducing apparatus which is capable of performing the automatic pause at any frame to which an active automatic pause trigger bit belongs.

The present invention has another object to provide a picture-reproducing apparatus which does not need a complicated buffer circuit.

The present invention has still another object to provide a picture-reproducing apparatus which has a short response time from release of the automatic pause to reproduction of the succeeding frames.

The present invention has further object to provide a picture-reproducing apparatus which is capable of performing the automatic pause function no matter which sector in a frame to be displayed in a freeze mode by the automatic pause function has an active automatic pause trigger bit.

According to a first aspect of the present invention, there is provided a picture-reproducing apparatus for reproducing a moving picture from picture codes recorded in a record medium having sectors, wherein picture codes and an automatic pause trigger bit are recorded in each of the sectors, the picture-reproducing apparatus comprising: a read-in circuit for reading the picture codes and the automatic pause trigger bit from each of the sectors in accordance with a decode sequence; code-inserting circuit for inserting a trigger detection code into the picture codes read by the read-in circuit if the automatic pause trigger bit read by the read-in circuit has an active value; a buffer for temporally storing the picture codes read by the read-in circuit; a decoder for reading the picture codes which have been temporally stored in the buffer, decoding picture data from the picture codes read from the buffer, and setting trigger information of each frame to an active value if the trigger detection code is inserted in the picture codes of respective frame or resetting the trigger information of each frame to an inactive value if the trigger detection code is not inserted in the picture codes of respective frame; a picture memory for temporally storing the picture data and the trigger information while making a relationship between the picture data and the trigger information with respect to a frame; a transfer control circuit for, in accordance with a display sequence, reading the picture data and the trigger information from the picture memory; and a display circuit for displaying a moving picture using the picture data read from the picture memory by the transfer control circuit; wherein when the transfer control circuit detects that the trigger information read from the picture memory has an active value, the transfer control circuit halts reading operation thereof from a succeeding frame, output a halt-requesting signal to the read-in circuit in order to cause the read-in circuit to halt operation thereof, and output the halt-requesting signal to the decoder in order to cause the decoder to halt operation thereof; and wherein when the transfer control circuit halts reading operation thereof, the display circuit displays a frame before the halt in a freeze mode.

According to a second aspect of the present invention, there is provided a picture-reproducing apparatus for reproducing a moving picture from picture codes recorded in a record medium having sectors, wherein picture codes and an automatic pause trigger bit are recorded in each of the sectors, the picture-reproducing apparatus comprising: a read-in circuit for reading the picture codes and the automatic pause trigger bit from each of the sectors in accordance with a decode sequence; code-inserting circuit for inserting a trigger detection code of an active value into the picture codes read by the read-in circuit if the automatic pause trigger bit read by the read-in circuit has an active value or inserting a trigger detection code of an inactive value into the picture codes read by the read-in circuit if the automatic pause trigger bit read by the read-in circuit has an inactive value; a buffer for temporally storing the picture codes read by the read-in circuit; a decoder for reading the picture codes which have been temporally stored in the buffer, decoding picture data from the picture codes read from the buffer, and setting trigger information of each frame to an active value if the trigger detection code of the active vale is inserted in the picture codes of respective frame or resetting the trigger information of each frame to an inactive value if the trigger detection code of the active value is not inserted in the picture codes of respective frame; a picture memory for temporally storing the picture data and the trigger information while making a relationship between the picture data and the trigger information with respect to a frame; a transfer control circuit for, in accordance with a display sequence, reading the picture data and the trigger information from the picture memory; and a display circuit for displaying a moving picture using the picture data read from the picture memory by the transfer control circuit; wherein when the transfer control circuit detects that the trigger information read from the picture memory has an active value, the transfer control circuit halts reading operation thereof from a succeeding frame, output a halt-requesting signal to the read-in circuit in order to cause the read-in circuit to halt operation thereof, and output the halt-requesting signal to the decoder in order to cause the decoder to halt operation thereof; and wherein when the transfer control circuit halts reading operation thereof, the display circuit displays a frame before the halt in a freeze mode.

These and other objects, features and advantages of the present invention will become more apparent in light of the following detailed description of the best mode embodiments thereof, as illustrated in the accompanying drawings.

BRIEF DESCRIPTION OF THE DRAWINGS

FIG. 4 is a table showing various start_code in picture codes complying with MPEG-1 standard;

DETAILED DESCRIPTION OF THE PREFERRED EMBODIMENT

Preferred embodiments according to the present invention will be described with reference to the accompanying drawings.

[First Embodiment]

The picture-reproducing apparatus according to the first embodiment of the present invention detects an active automatic pause trigger bit in picture codes which have been read, holds trigger information until picture data of the frame including the active automatic pause trigger bit are transferred to a display circuit, halts decoding operation after having been transferred picture data to display circuit, whereby displaying a picture in a freeze mode at any frame including a frame whose decode order and display order differs each other is accomplished.

In addition, because reading operation of picture codes is halted after decoding operation has been halted, when normal reproduction is resumed from a state of automatic pause, it is possible to resume decoding operation as soon as writing operation of picture codes has resumed and whereby it is possible to display the next frames without delay.

Figure 1:
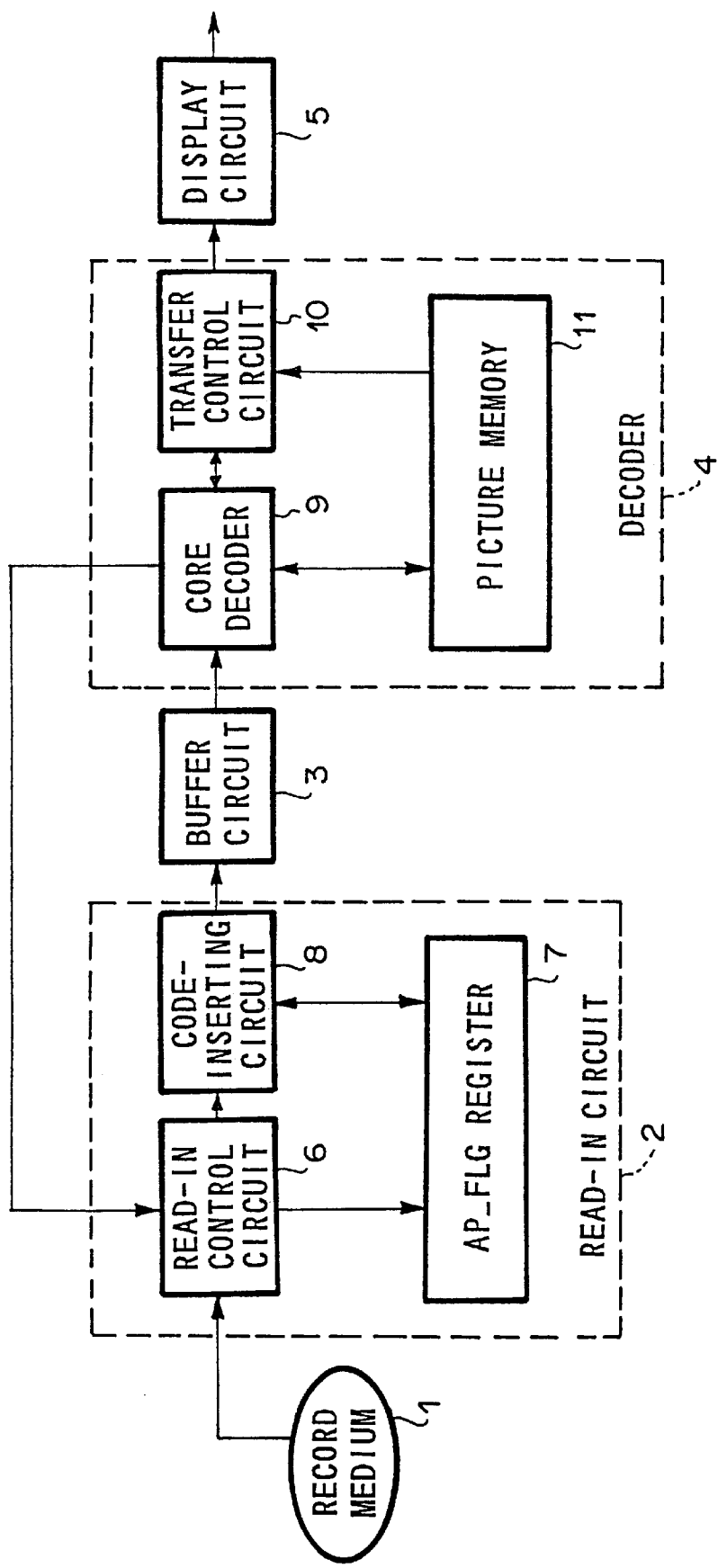
FIG. 1 is a block diagram showing the picture-reproducing apparatus according to the embodiments of the present invention.

Referring to FIG. 1, read-in control circuit 6 in read-in circuit 2 reads an automatic pause trigger bit from record medium 1 and when read-in control circuit 6 detects that the automatic pause trigger bit is active, read-in control circuit 6 sets AP_FLG register 7 to "1" and outputs the picture codes read from User data area on record medium 1 to code-inserting circuit 8. Code-inserting circuit 8 inserts a code indicating that the trigger bit was active (hereinafter referred to as "a trigger detection code") into inputted picture codes and writes the resultant codes to buffer circuit 3 when "1" is set in AP_FLG register 7.

The picture codes written in buffer circuit 3 are temporally stored in buffer circuit 3 and then read by decoder 4.

Core decoder 9 in decoder 4 decodes picture data from the picture codes. When core decoder 9 detects the trigger detection code while decoding, core decoder 9 sets trigger information of a frame which has an active automatic pause trigger bit to "1". the trigger information is stored in picture memory 11. When picture data of a frame are transferred from picture memory 11 to display circuit 5 via transfer control circuit 10, transfer control circuit 10 reads the trigger information of the frame, outputs a halt-requesting signal to halt a decoding operation of the next frame to core decoder 9 when the trigger information has an active value. Core decoder 9 transfers the halt-requesting signal to read-in circuit 2 when core decoder 9 has finished decoding one frame in order to cause read-in circuit 2 to halt reading operation from record medium 1. The above operation realizes the automatic pause function.

Referring to FIG. 1, the picture-reproducing apparatus according to this embodiment comprises: read-in circuit 2 which reads an automatic pause trigger bit in a Submode area from record medium 1 having a Submode area, a User Data area and so forth in a structured sector, inserts a trigger detection code to the picture codes read from a User Data area when read-in circuit 2 detects that the automatic pause trigger bit is active, and writes these codes to buffer circuit 3; buffer circuit 3 which temporally stores the picture codes and inserted trigger detection code written by read-in circuit 2 and from which the codes stored therein are read by decoder 4; decoder 4 which (1) executes decoding operation using the picture codes read from buffer circuit 3, (2) transfers picture data of a decoded frame, (3) when it detects a trigger detection code, sets trigger information for a corresponding frame and holds the trigger information until the picture data of the decoded frame is transferred to display circuit 5, and (4) when the trigger information of the transferred frame is active, outputs a halt-requesting signal to read-in circuit 2 to halt read-in circuit 2; and display circuit 5 which displays picture data transferred from decoder 4.

Read-in circuit 2 comprises: AP_FLG register 7 which holds trigger information corresponding to the value of an automatic pause trigger bit; read-in control circuit 6 which sets AP_FLG register 7 for holding the trigger information indicated by the automatic pause trigger bit to "1" indicating that the trigger bit is active when it detects that the automatic pause trigger bit of the currently reading sector is active, thereafter reads picture codes from a User Data area and writes the read picture codes to code-inserting circuit 8; code-inserting circuit 8 which inserts a trigger detection code into the picture codes inputted from read-in control circuit 6 while referring to a value of AP_FLG register 7 and writes these codes to buffer circuit 3.

Decoder 4 comprises: picture memory 11 which temporally stores picture data and trigger information for every frame; core decoder 9 which (1) executes decoding process using picture codes read from buffer circuit 3 and, if necessary, picture data read from picture memory 11, (2) writes the result of the decoding process to picture memory 11, (3) when it detects a trigger detection code during decoding, sets trigger information of a corresponding frame in picture memory 11 to "1", and (4) when a halt-requesting signal is inputted from transfer control circuit 10, halts decoding the next frame and transfers the halt-requesting signal to read-in circuit 2; transfer control circuit 10 which (1) reads picture data of a decoded frame in picture memory 11 in accordance with the display sequence and transfers the picture data to display circuit 5, and (2) outputs a halt-requesting signal to core decoder 9 in accordance with trigger information of the frame which has been stored in picture memory 11 and is currently transferred.

Picture codes necessary to decode each frame are dividedly recorded in a User data area of each sector on record medium 1. In addition, if there is a frame which is desired to be displayed in a freeze mode, an active automatic pause trigger bit is recorded in an Submode area of an arbitrary sector in the frame.

Figure 2:
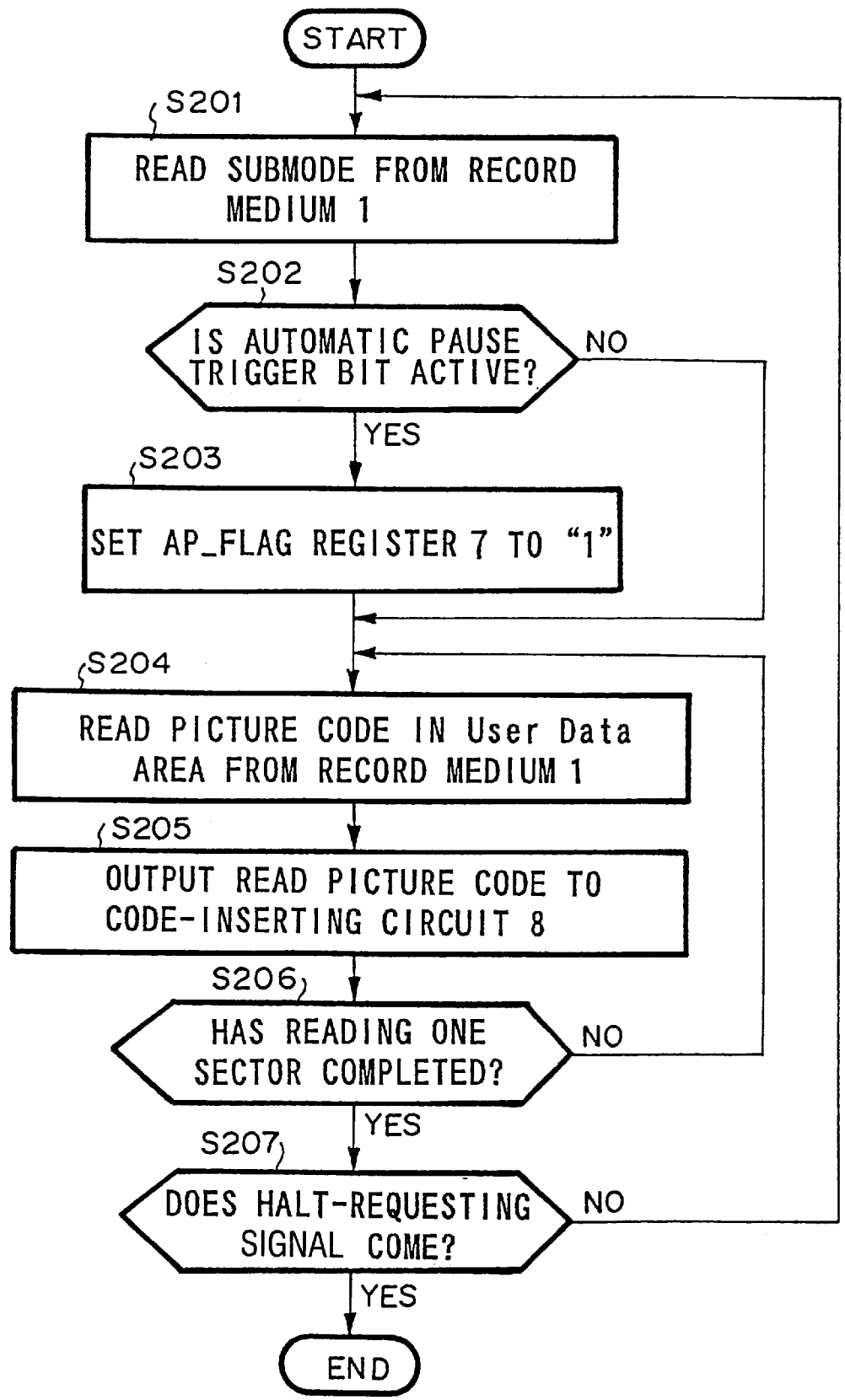
FIG. 2 is a flowchart showing the operation of read-in circuit 6.

The explanation of the operation of read-in circuit 2 begins with the explanation of the operation of read-in control circuit 6 with reference to FIG. 2 as follows.

Read-in control circuit 6 reads the Submode area in a sector which is currently read from record medium 1 at step S201. Next, read-in control circuit 6 judges whether or not an automatic pause trigger bit is active at step S202. If the result of the judgement at step S202 is affirmative, read-in control circuit 6 sets AP_FLG register 7 which represents automatic pause trigger information of each sector to "1" at step S203, whereas if the result of the judgement at step S202 is negative, step S203 is skipped. Thereafter, read-in control circuit 6 reads picture codes in the User Data in the sector which is currently read at step S204 and outputs the picture codes to code-inserting circuit 8 at step S205. These operations at steps S204 and S205 are repeated until all the picture codes in the User Data area of the sector are read by judgement at step S206. After having read all the picture codes in the User Data area of the sector, read-in control circuit 6 judges whether or not there is a halt-requesting signal from core decoder 9 to read-in control circuit 6 at step S207. If the result of the judgement at step S207 is negative, the operation of read-in circuit 32 returns to step S201 to read the next sector, whereas if the result of the judgement at step S207 is affirmative, the operation of read-in circuit 32 halts.

Figure 3:
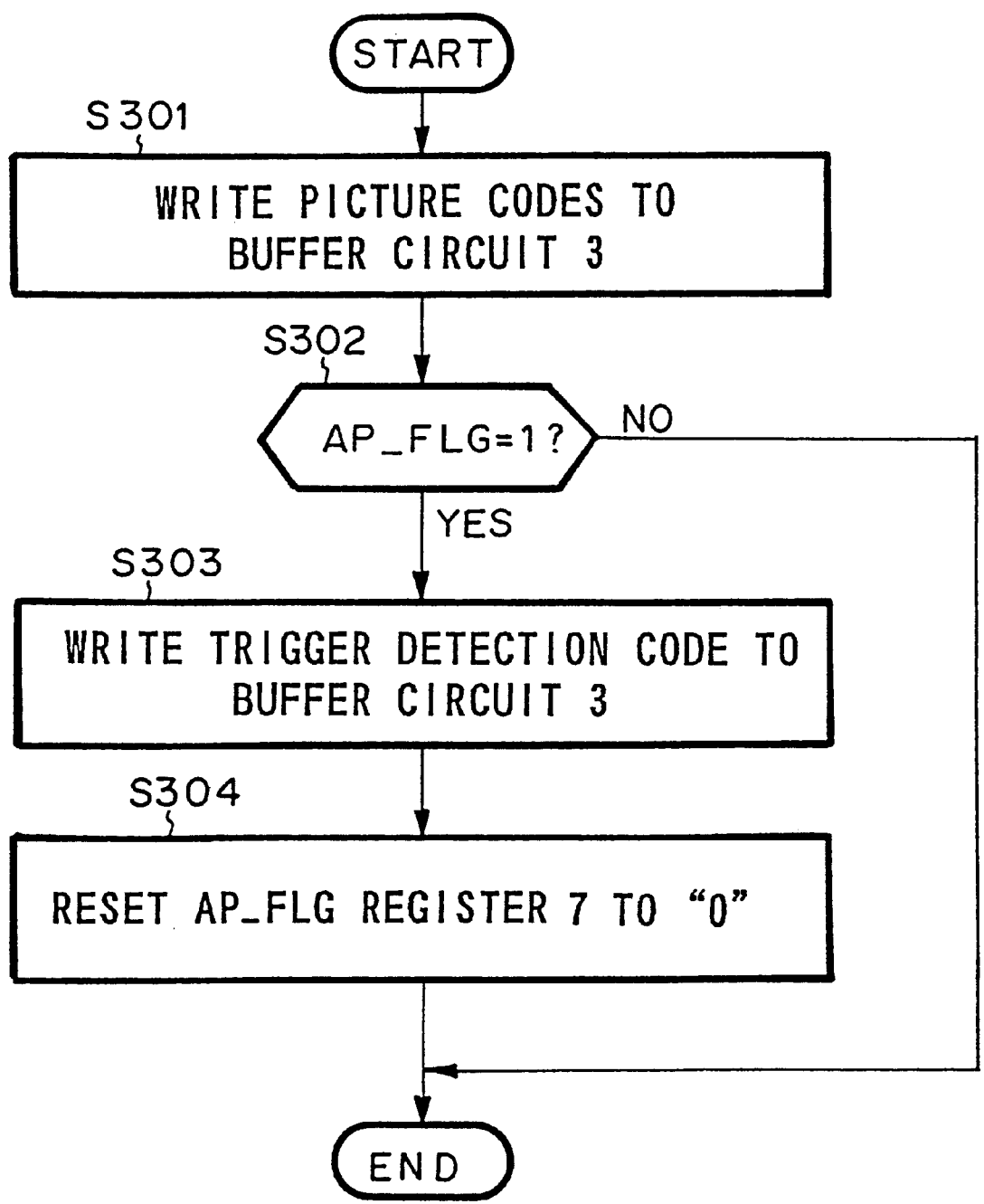
FIG. 3 is a flow chart showing the operation of code-inserting circuit 8 according to a first embodiment of the present invention.

Next, the operation of code-inserting circuit 8 is explained hereunder with reference to FIG. 3.

When the picture codes are inputted to code-inserting circuit 8 by read-in circuit 6, code-inserting circuit 8 writes the picture codes to buffer circuit 3 at step S301. Thereafter, read-in control circuit 6 judges whether the contents of AP_FLG register 7 is "1" at step S302. If the result of the judgement at step S302 is affirmative, code-inserting circuit 8 writes a trigger detection code to buffer circuit 3 at step S303 and resets AP_FLG register 7 to "0" at step S304, whereas if the result of the judgement at step S302 is negative, steps S303 and S304 are skipped. These operations from step S301 through step S304 are executed for every sector.

Referring to FIG. 4, if unused or reserved start_code such as 0000_01B0 for example is assigned to the trigger detection code, decoder can easily detects the trigger detection code.

The start_code is inserted into an arbitrary position in picture codes in the User Data area. One or more start_ codes exists in one sector.

In accordance with the operation explained above, read-in circuit 2 inserts a trigger detection code into picture codes when read-in circuit 2 detects that an automatic pause trigger bit is active.

Buffer circuit 3 temporally stores the picture codes written by code-inserting circuit 8. In addition, buffer circuit 3 outputs the picture codes to core decoder 9 in the sequence identical with the write sequence when two conditions are simultaneously satisfied. The two conditions are (1) buffer circuit 3 is requested to output the picture codes to core decoder 9 by core decoder 9 and (2) buffer circuit 3 has stored an effective or sufficient amount of picture codes.

The explanation of the operation of decoder 4 begins with the explanation of the operation of core decoder 9 with reference to FIG. 5 as follows.

At the beginning of decoding a frame, core decoder 9 resets the trigger information of the frame to be decoded to "0" at step S501. The trigger information is stored in picture memory 11. Thereafter, core decoder 9 waits on until it is enabled to read a picture code from buffer circuit 3 at step S502. When it is enabled, core decoder 9 reads a picture code from buffer circuit 3 at step S503. Thereafter, core decoder 9 judges whether or not the read picture code is a trigger detection code at step S504. If the result of the judgement at step S504 is affirmative, core decoder 9 sets the trigger information of the currently decoded frame in picture memory 11 to "1" at step S505. If the result of the judgement at step S504 is negative, core decoder 9 decodes picture data from the picture code while, if necessary, using picture data in picture memory 11 at step S506 and writes the resultant picture data to picture memory 11 at step S507. These operations from step S502 through step S507 are repeated until decoding one frame is completed by judgement at step S508. After having finished to decode one frame, core decoder 9 judges whether there is a halt-requesting signal from transfer control circuit 10 at step S509. If the result of the judgement at step S509 is negative, the operation of core decoder 9 returns to step S501 so that core decoder 9 continually proceeds to decoding the next frame. If the result of the judgement at step S501 is affirmative, core decoder 9 transfers the halt-requesting signal to read-in circuit 2 at step S510 and halts the decoding operation.

Figure 6:
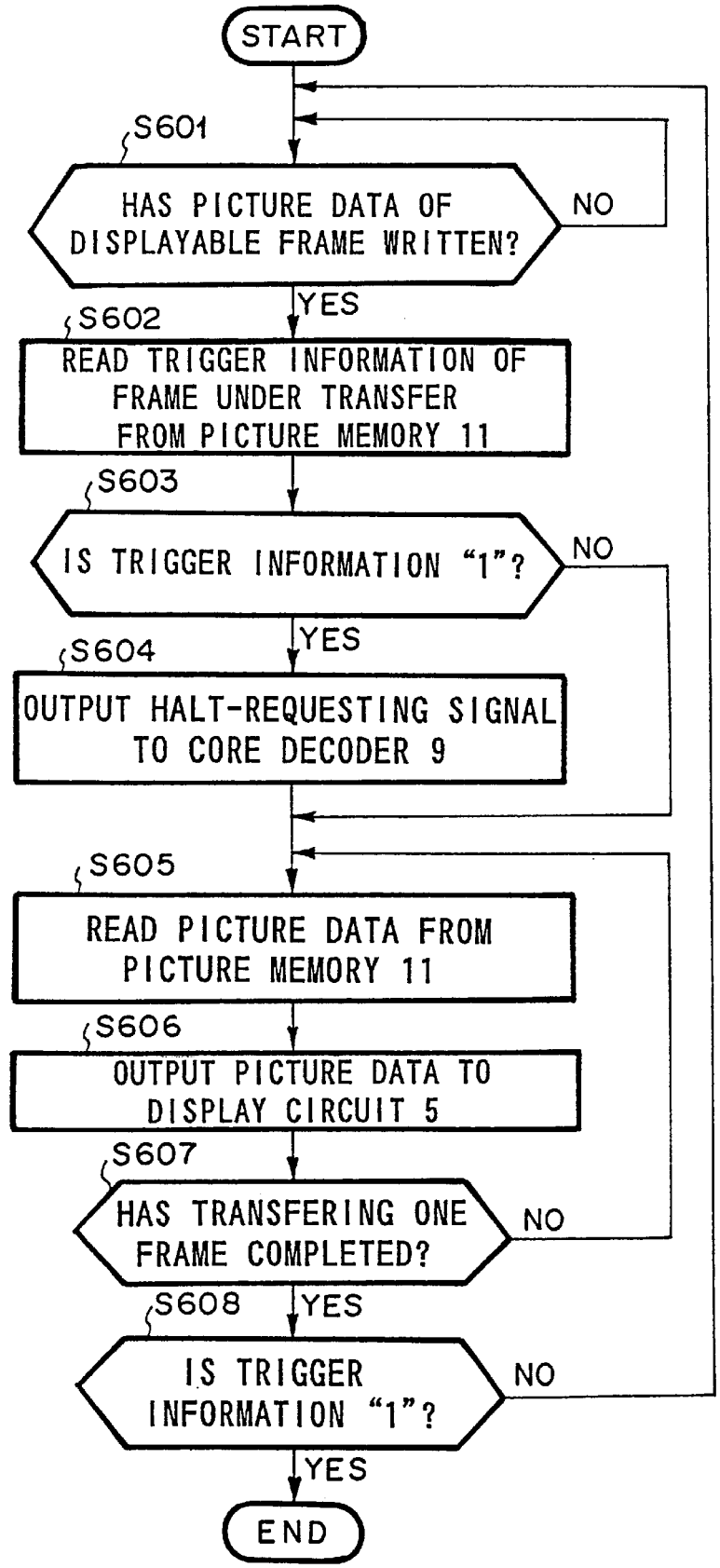
FIG. 6 is a flowchart showing the operation of transfer control circuit 10.

Next, the operation of transfer control circuit 10 is explained hereunder with reference to FIG. 6.

First of all, transfer control circuit 10 waits on until the picture data of the frame which is displayable in accordance with the display sequence have been written to picture memory 11 at step S601. When the picture data of the frame have been written, transfer control circuit 10 reads the trigger information of the frame transferred from picture memory 11 at step S602. Thereafter, transfer control circuit 10 judges whether or not the value of the rigger information is "1" at step S603. If the result of the judgement at step S603 is affirmative, transfer control circuit 10 outputs a halt-requesting signal to core decoder 9 to cause core decoder 9 to halt decoding the next frame at step S604, whereas if the result of the judgement at step S603 is negative, step S604 is skipped. Thereafter, transfer control circuit 10 reads the picture data of the displayable frame from picture memory 11 at step S605 and outputs the picture data to display circuit 5 at step S606. Transfer control circuit 10 repeats the operations at step S605 and step S606 for the whole of the displayable frame by judgement at step S607. After exiting the loop of from S605 to step S607, transfer control circuit 10 judges whether or not the trigger information read at step S602 is "1" at step S608. If the result of the judgement at step S608 is negative, the operation of transfer control circuit 10 returns to step S601 so that transfer control circuit 10 waits on until the picture data of the next frame which is displayable in accordance with the display sequence have been written to picture memory 11 at step S601. If the result of the judgement at step S608 is affirmative, transfer control circuit 10 halts operation thereof.

Display circuit 5 displays the picture data of frames transferred from decoder 4. When the transfer of picture data from decoder 4 to display circuit 5 halts, display circuit 5 continues to display the picture data of the last frame before the halt in a freeze mode until the transfer of picture data of the next frame begins.

Figure 7:
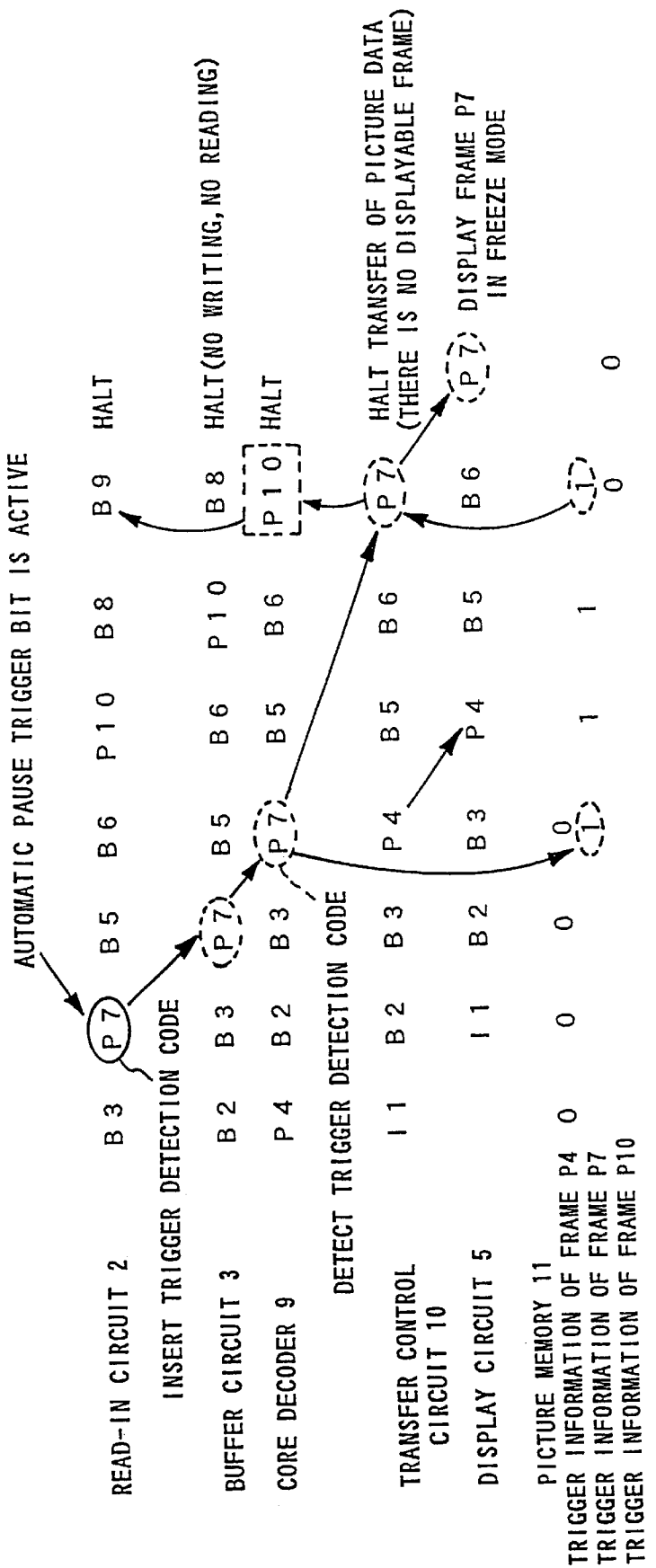
FIG. 7 is a timing chart showing the operation of the picture-reproducing apparatus according to the embodiments of the present invention.

Next, the operation of the whole of the picture-reproducing apparatus according to this embodiment shown in FIG. 1 is explained hereunder with reference to FIG. 7.

In FIG. 7, the frame processed by read-in circuit 2, the frame processed by buffer circuit 3, and the frame processed by decoder 4 are shifted by just one frame from one to another for convenience to easily explain their operations.

When read-in circuit 2 detects an active automatic pause trigger bit while reading any sector of frame P7, read-in circuit 2 inserts a trigger detection code into the picture codes of frame P7 and writes these codes to buffer circuit 3. Because the automatic pause trigger bit of frame P10 is not active, read-in circuit 2 does not insert a trigger detection code into the picture codes of frame P10 and writes the picture codes of the frame P10 without a trigger detection code. Decoder 4 reads the picture codes temporally stored in buffer circuit 3. When core decoder 9 detects the trigger detection code of frame P7, core decoder 9 sets the trigger information of frame P7 in picture memory 11 to "1". Because a displayable frame in accordance with the display sequence at this time is frame P4, transfer control circuit 10 reads the picture data of frame P4 from picture memory 11 and transfers the picture data of frame P4 to display circuit 5. At this time, because the trigger information of frame P4 is "0", transfer control circuit 10 does not outputs a halt-requesting signal to core decoder 9.

Figure 8:
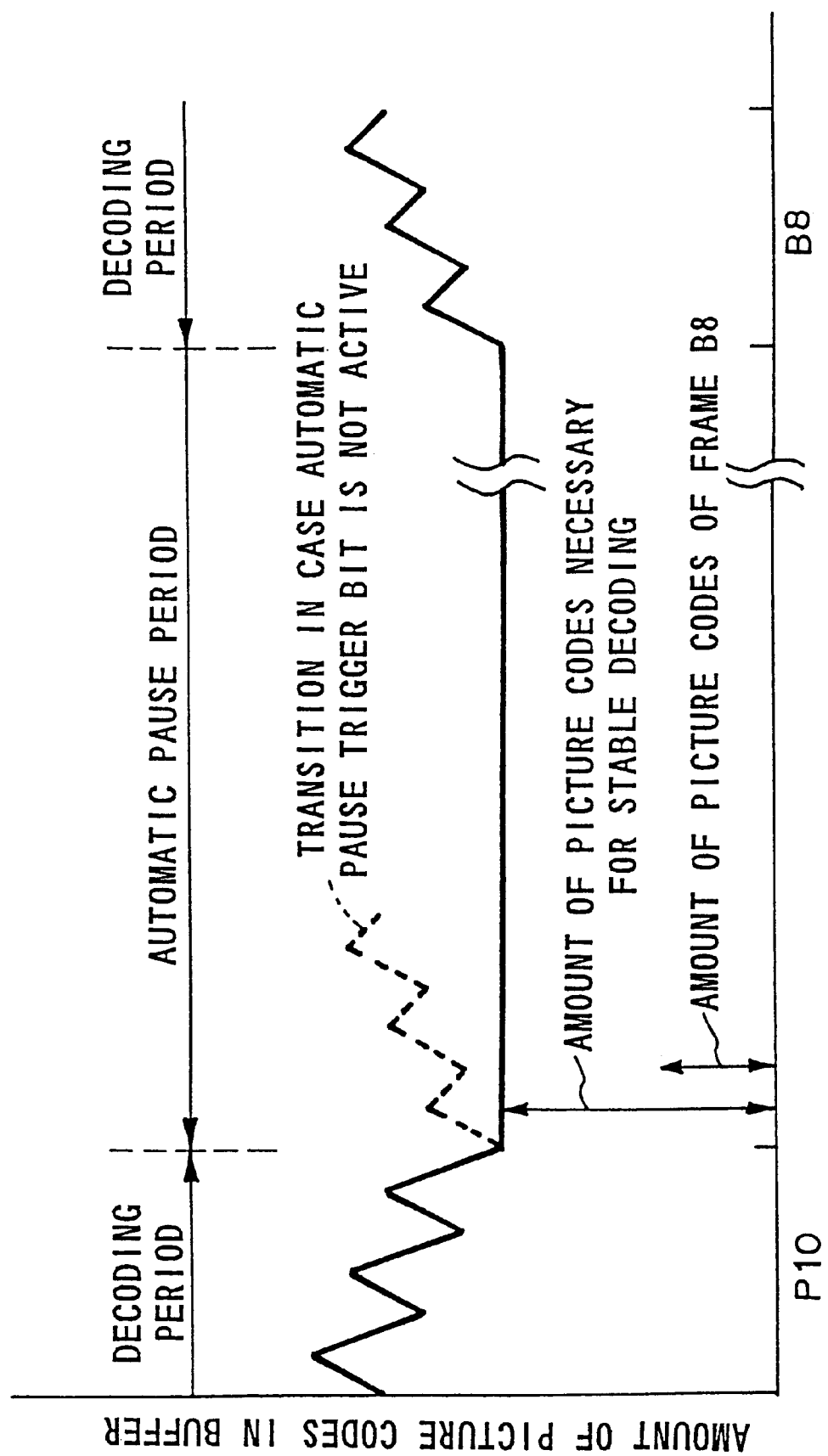
FIG. 8 is a diagram showing an example of variation of the amount of picture codes in buffer circuit in the automatic pause according to the embodiment of the present invention.

Because core decoder 9 does not detect a trigger detection code when core decoder 9 is decoding frame P10, core decoder 9 resets the trigger information of frame P10 in picture memory 11 to "0". Because a displayable frame in accordance with the display sequence at this time is frame P7, transfer control circuit 10 reads the picture data of frame P7 from picture memory 11 and transfers the picture data of frame P7 to display circuit 5. At this time, because the trigger information of frame P7 is "1", transfer control circuit 10 outputs a halt-requesting signal to core decoder 9 in order to cause core decoder 9 not to decode frame B8 succeeding frame P10 in the decode sequence. Core decoder 9 transfers the halt-requesting signal to read-in circuit 2 when core decoder 9 has completed decoding frame P10 in order to cause read-in circuit 2 to halt reading picture codes from record medium 1. Therefore, writing picture codes to buffer circuit 3 and reading picture codes from buffer circuit 3 almost simultaneously halt. Thus, buffer circuit 3 halts while storing as much picture codes as buffer circuit 3 stores in a steady-state as shown in FIG. 8. In addition, because decoder 4 does not transfer the picture data of the frames succeeding frame P7, display circuit 5 continues to display frame P7 in freeze mode, whereby the automatic pause function is realized.

In addition, when the automatic pause is released, writing picture codes to buffer circuit 3 by read-in circuit 2 and decoding by decoder 4 resume simultaneously because buffer circuit 3 has been halted while storing as much picture codes as buffer circuit 3 stores in a steady-state or as much picture codes sufficient for stable decoding.

[Second Embodiment]

Figure 10:
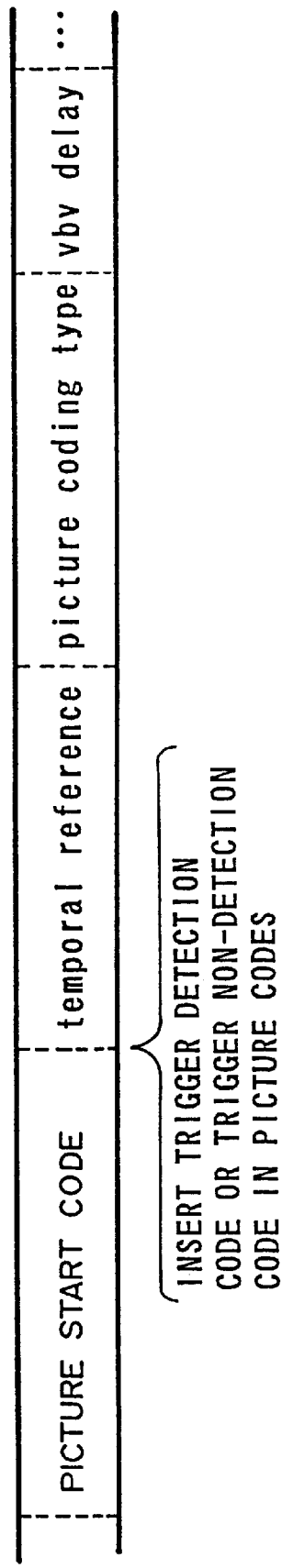
FIG. 10 is a diagram showing picture codes in a picture layer.
Figure 11:
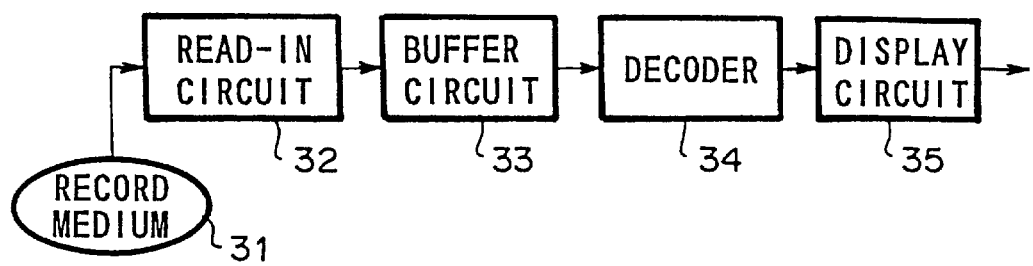
FIG. 11 is a block diagram showing a conventional picture-reproducing apparatus.
Figure 12:
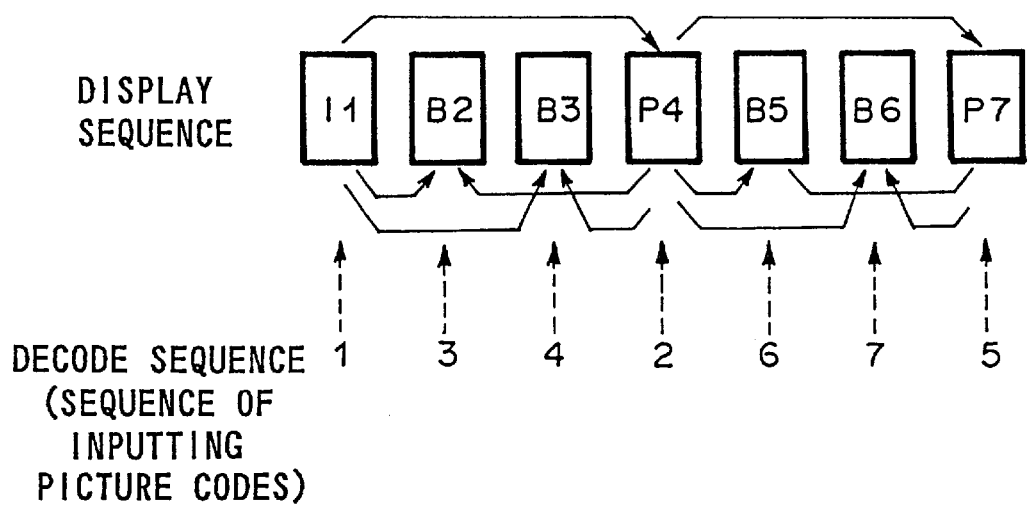
FIG. 12 is a diagram showing the relationship between the display sequence and decode sequence complying with MPEG standard.
Figure 13:
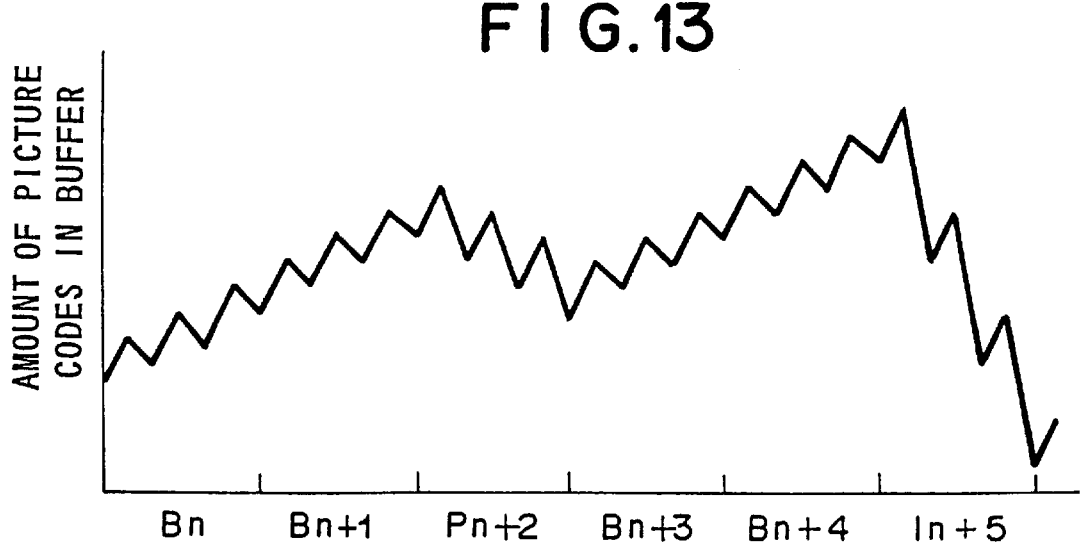
FIG. 13 is a diagram showing an example of the relationship between variation of the amount of picture codes in buffer circuit and picture type in normal reproduction.
Figure 14:
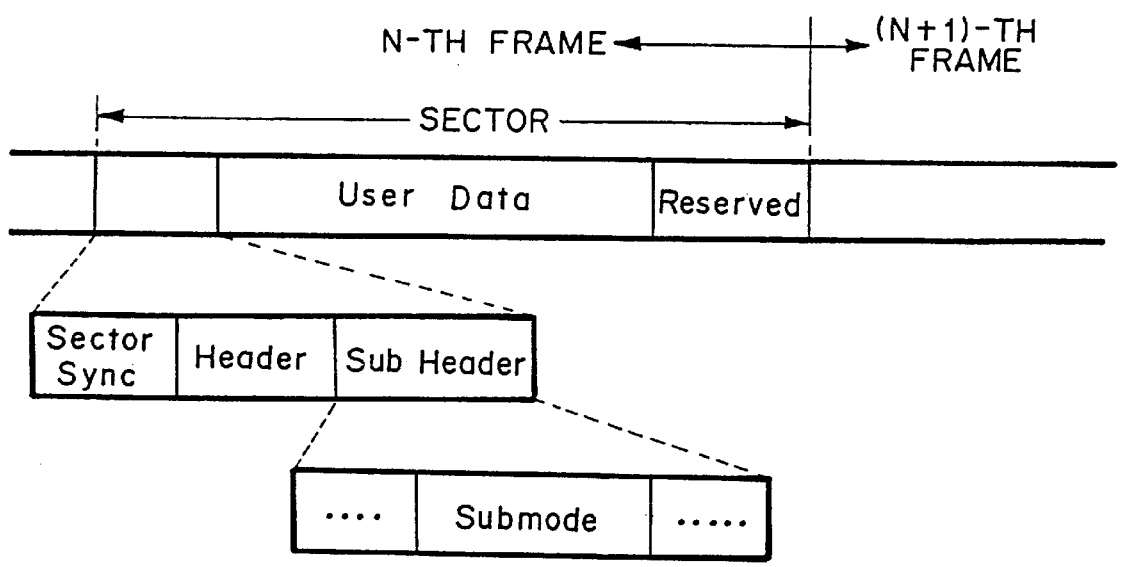
FIG. 14 is a diagram showing the sector structure defined by CDROM-XA Forum 2.
Figure 15:
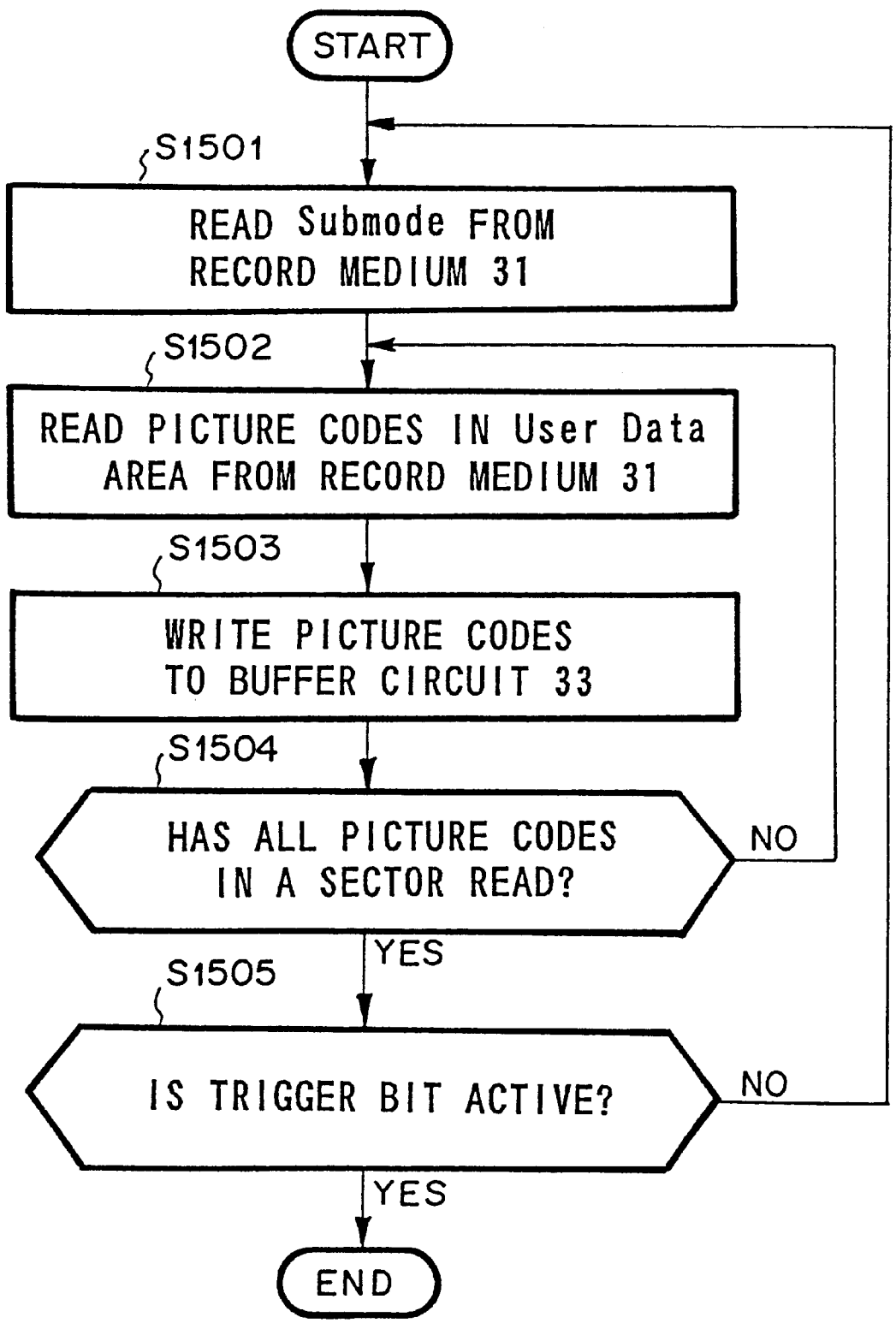
FIG. 15 is a flowchart showing the operation of read-in circuit 32.
Figure 16:
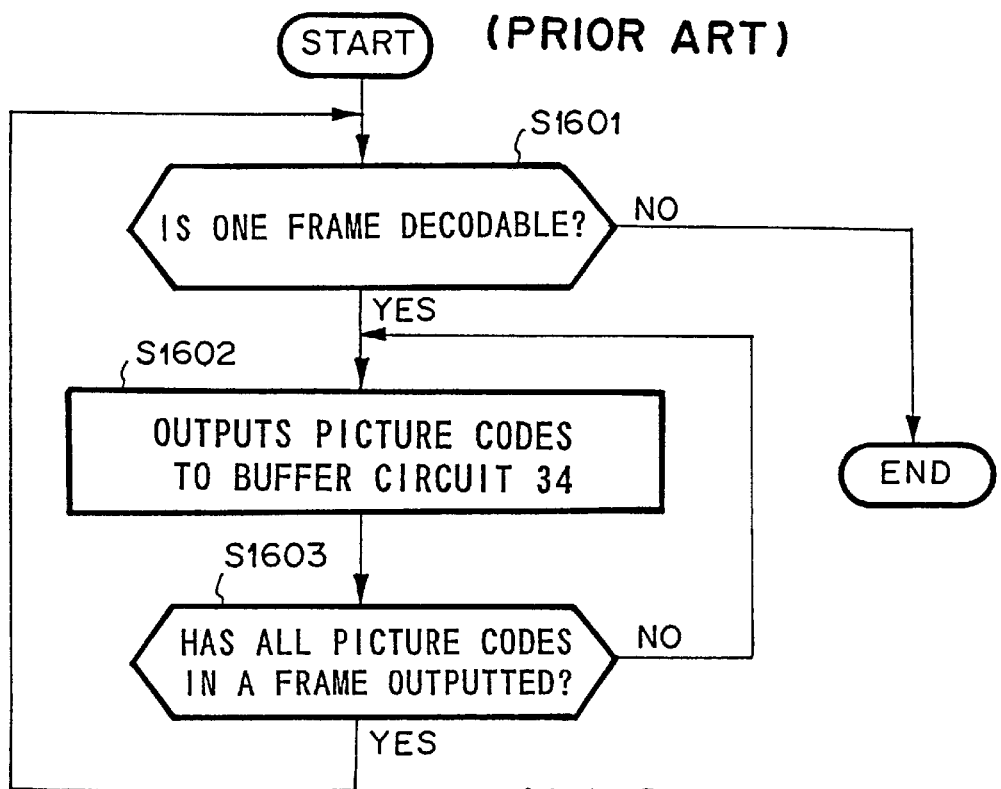
FIG. 16 is a flowchart showing the operation of buffer circuit 33.
Figure 17:
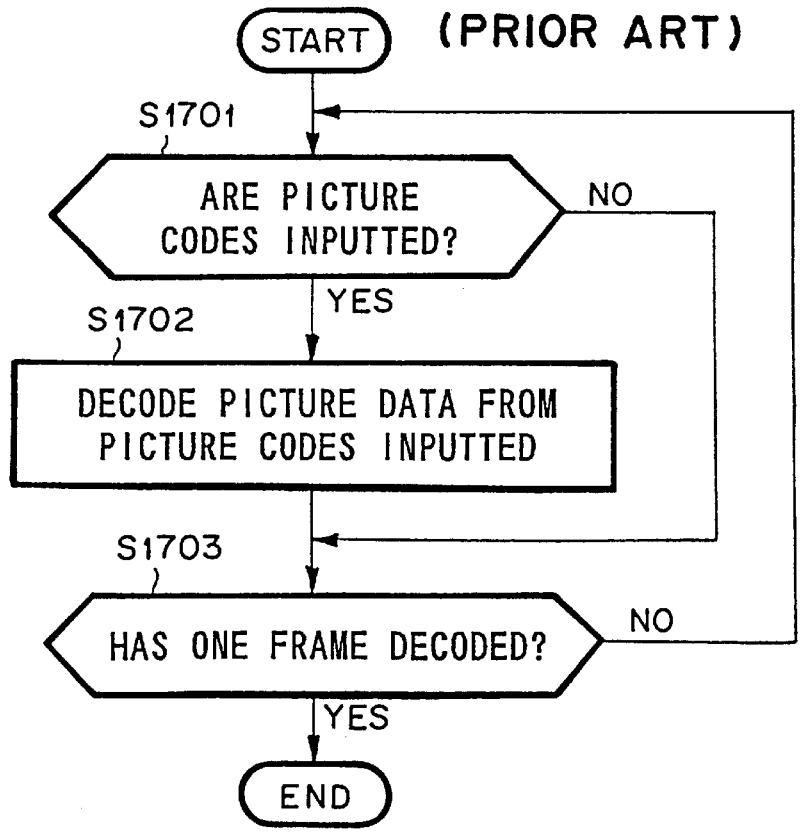
FIG. 17 is a flowchart showing the operation of decoder 34.
Figure 18:
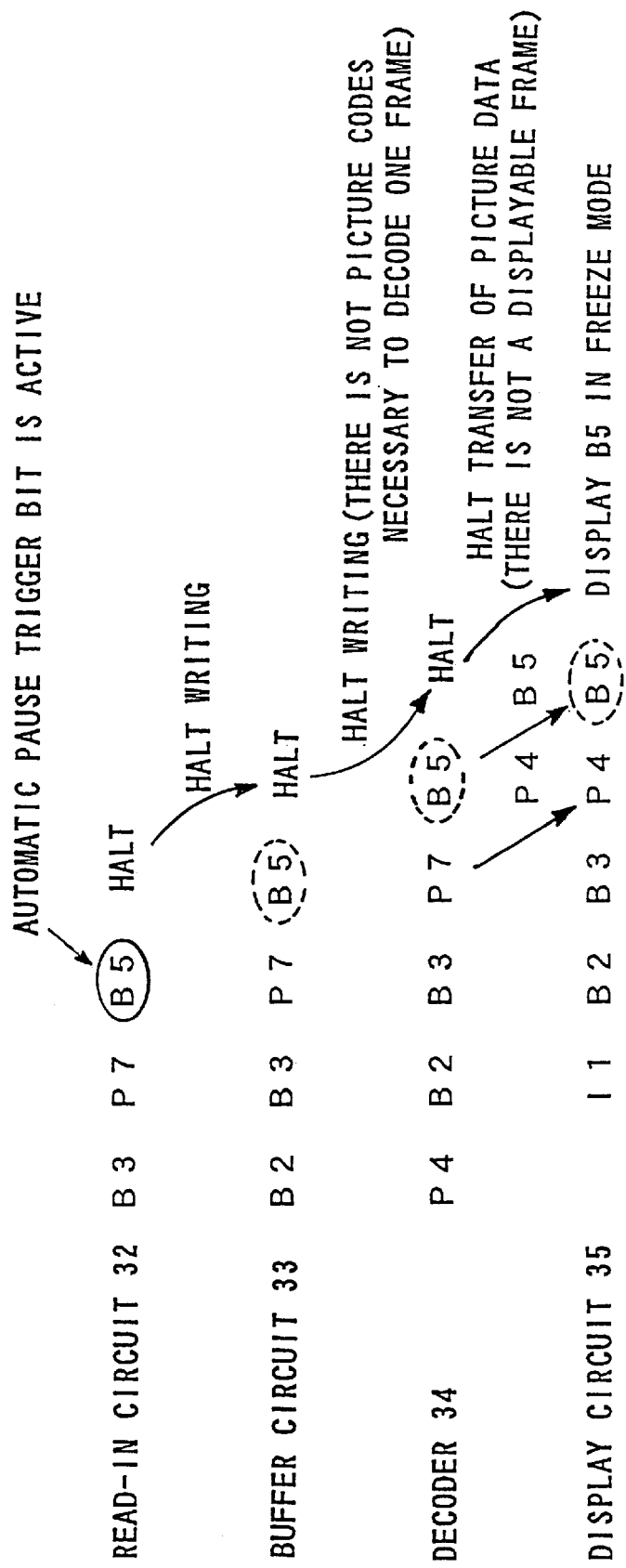
FIG. 18 is a timing chart showing the operation of the conventional picture-reproducing apparatus.
Figure 19:
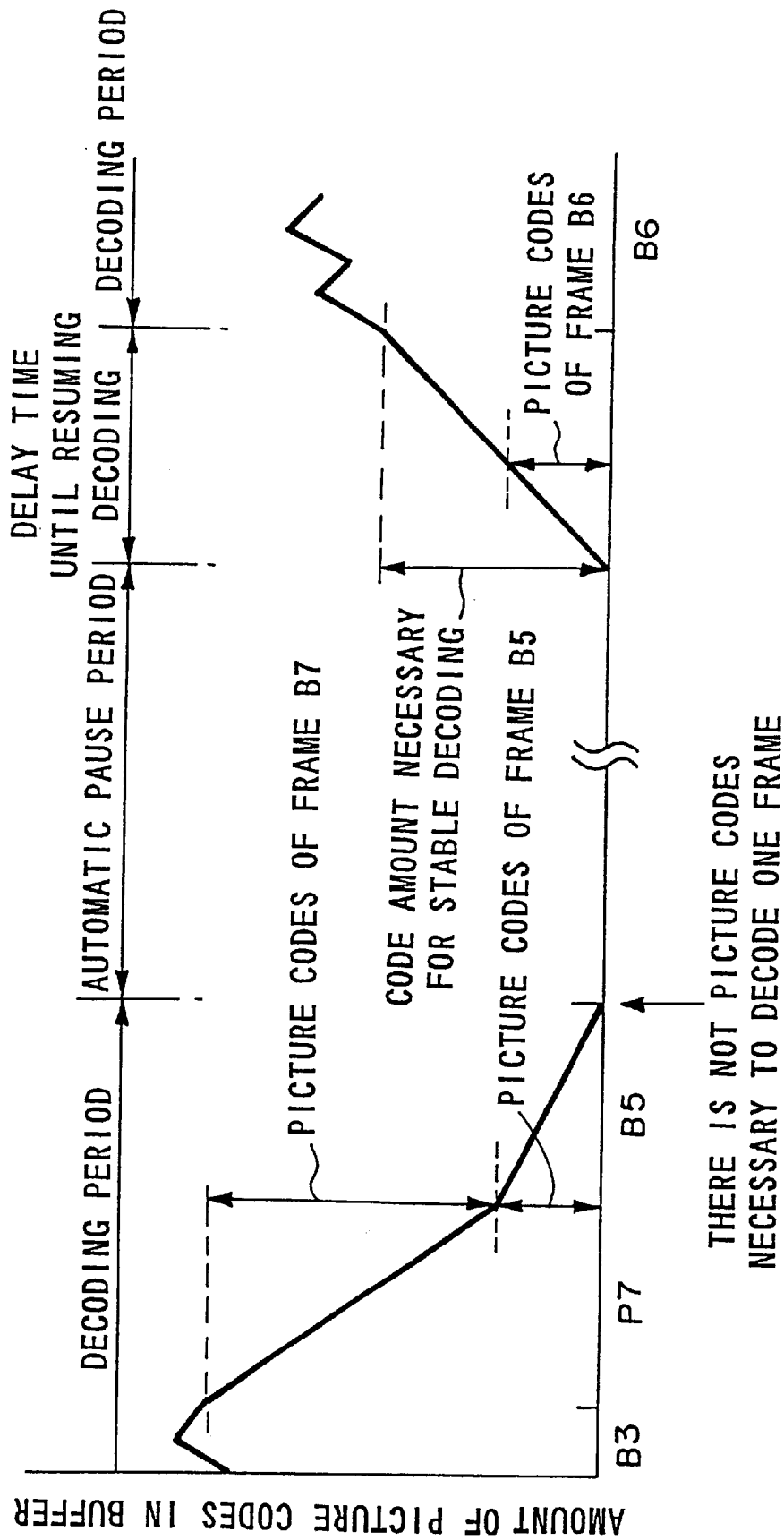
FIG. 19 is a diagram showing an example of variation of the amount of picture codes in buffer circuit 33 in the automatic pause according to the conventional picture-reproducing apparatus.
Figure 20:
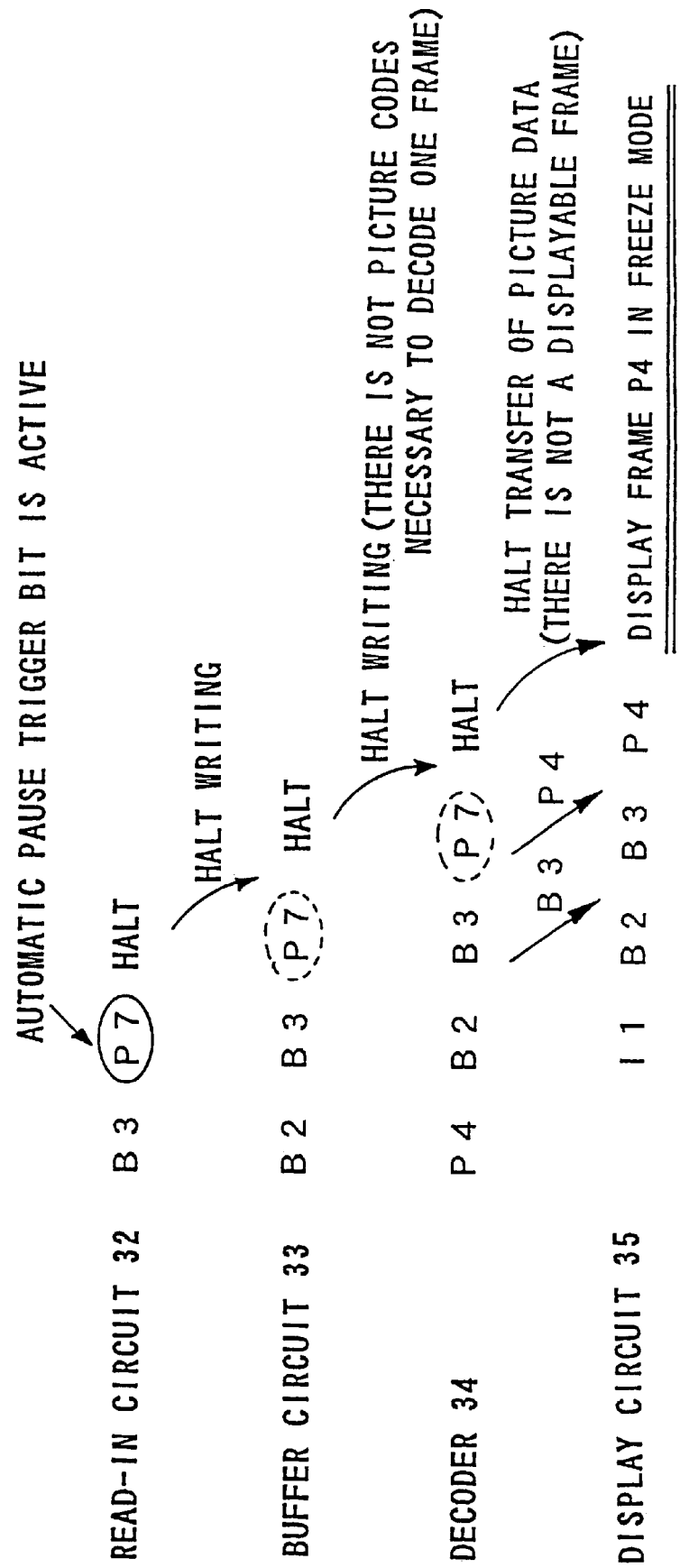
FIG. 20 is another timing chart showing the operation of the conventional picture-reproducing apparatus.

According to the second embodiment, the automatic pause trigger bit of the sector, (1) which sector belongs to a frame which is desired to be displayed in a freeze mode by the automatic pause function and (2) in which sector a picture_start_code is recorded, is always active on a record medium 1. In addition, code-inserting circuit 8 always inserts a code which is a trigger detection code indicating that the automatic pause trigger bit is active or a trigger non-detection signal indicating the automatic pause trigger bit is not active after the picture_start_code as shown in FIG. 10.

Figure 9:
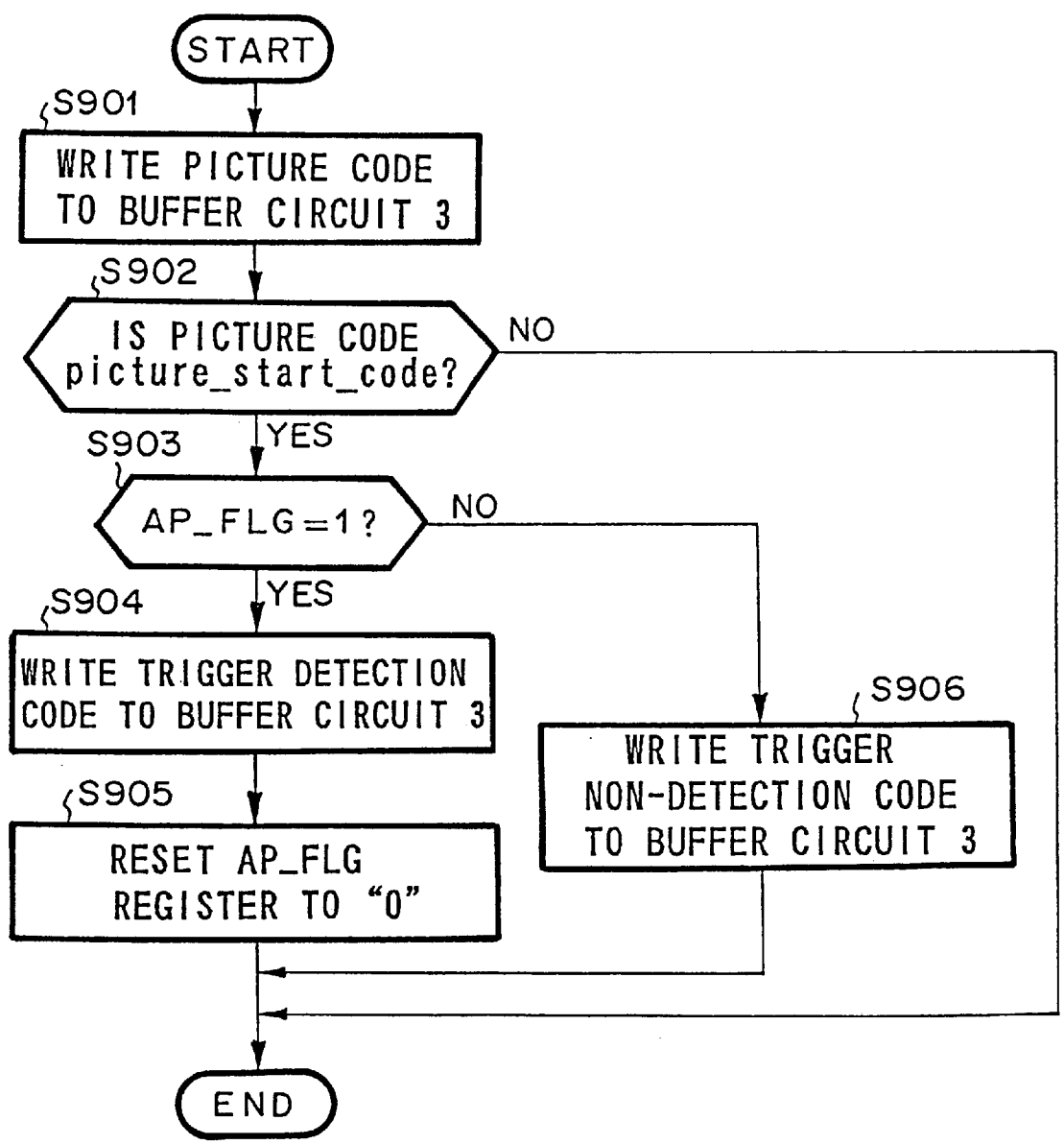
FIG. 9 is a flow chart showing the operation of code-inserting circuit 8 according to a second embodiment of the present invention.

Referring to FIG. 9, upon inputting a picture code from read-in control circuit 6, code-inserting circuit 8 writes the picture code to buffer circuit 3 at step S901. Thereafter, code-inserting circuit 8 judges whether or not the written picture code is a picture_start_code 8 at step S902. If the result of judgement at step S902 is affirmative, code-inserting circuit 8 judges whether or not the value of AP_FLG 7 is "1" at step S903. If the result of judgement at step S903 is negative, code-inserting circuit 8 writes a trigger non-detection code to buffer circuit 3 after the picture_start_code at step S906. If the result of judgement at step S903 is affirmative, code-inserting circuit 8 writes a trigger detection code to buffer circuit 3 after the picture_start_code at step S904 and resets AP_FLG 7 to "0" at step S905.

When core decoder 9 detects a trigger non-detection signal, core decoder 9 discards the trigger non-detection signal, whereas when core decoder 9 detects a trigger detection code, core decoder 9 operates in the same manner as the first embodiment.

For example, the trigger detection code is composed of a bit of "1" and the trigger non-detection code is composed of a bit of "0".

According to the second embodiment, core decoder 9 can recognize a trigger detection code and a trigger non-detection signal which are a kind of picture codes representing pause information notwithstanding these codes are composed of a small number of bits because these codes are inserted into a fixed position.

In the above embodiments, record medium 1 is assumed to be a CD (Compact Disc). However, record medium 1 is not limited to a CD.

In addition, in the above embodiments, an automatic pause trigger information is located in a Submode are. However, an automatic pause trigger information may be located in a area other than a Submode area.

Further, in the above embodiments, the picture codes in one frame are divided into a plurality of sectors. However, the picture codes in one frame may be included in one sector.

Still further, in the above embodiment, it is assumed that the picture codes complies with the MPEG standard. However, this invention is effective for other picture compression system in which a decode sequence and a display sequence are different each other.

Still further, in the above embodiments, it is assumed that core decoder 9 and read-in circuit 2 halt in this written order in accordance with transfer of a halt-requesting signal outputted from transfer control circuit 10 after transfer control circuit 10 detects that trigger information is "1". However, core decoder 9 and read-in circuit 2 may simultaneously halt.

Still further, a trigger detection code may have any bit pattern as long as it is recognizable by core decoder 9.

Still further, it is assumed in the second embodiment that a trigger detection code or a trigger non-detection code is inserted after a picture_start_code. However, a trigger detection code or a trigger non-detection code may be inserted into another fixed position.

Still further, in the above embodiment, it is assumed that trigger information for every frame is stored in picture memory 11. However, trigger information may be stored in registers.

The present invention has the effects as follows.

As shown in FIG. 7, a reproduced moving picture may displayed in a freeze mode at any frame, that is, a reproduced moving picture may be displayed in a freeze mode even at a frame whose decode order and display order are different each other because read-in circuit 2 inserts a trigger detection code into the picture codes read from a User Data area when read-in circuit 2 detects an active automatic pause trigger bit, core decoder 9 sets the trigger information of the currently decoded frame in picture memory 11 to "1", and transfer control circuit 10 halts the decoding operation of core decoder 9 when the trigger information of the frame which transfer control circuit 10 is transfering to display circuit 5 is "1".

Buffer circuit 3 is simplified to contain only a memory because a control for every frame is executed by core decoder 9, a halt of read-in circuit 2 is controlled by core decoder 9, and a halt of core decoder 9 is controlled by transfer control circuit 10.

Buffer circuit 3 halts while storing as much picture codes as buffer circuit 3 stores in a steady-state as shown in FIG. 8 because writing to buffer circuit 3 and reading from buffer circuit 3 almost simultaneously halt due to the operation in which transfer control circuit 10 causes core decoder 9 to halt decoding and then, upon completion of decoding one frame, core decoder 9 causes read-in circuit 2 to halt reading from record medium 1. Therefore, when the picture reproduction in a non-freeze mode resumes from the automatic pause state, buffer circuit 3 is storing picture codes enough for decoding. Thus, it is possible to resume decoding the next frame in the decode sequence and to resume displaying the next frame in the display sequence as soon as writing to buffer circuit 3 resumes.

Figure 5:
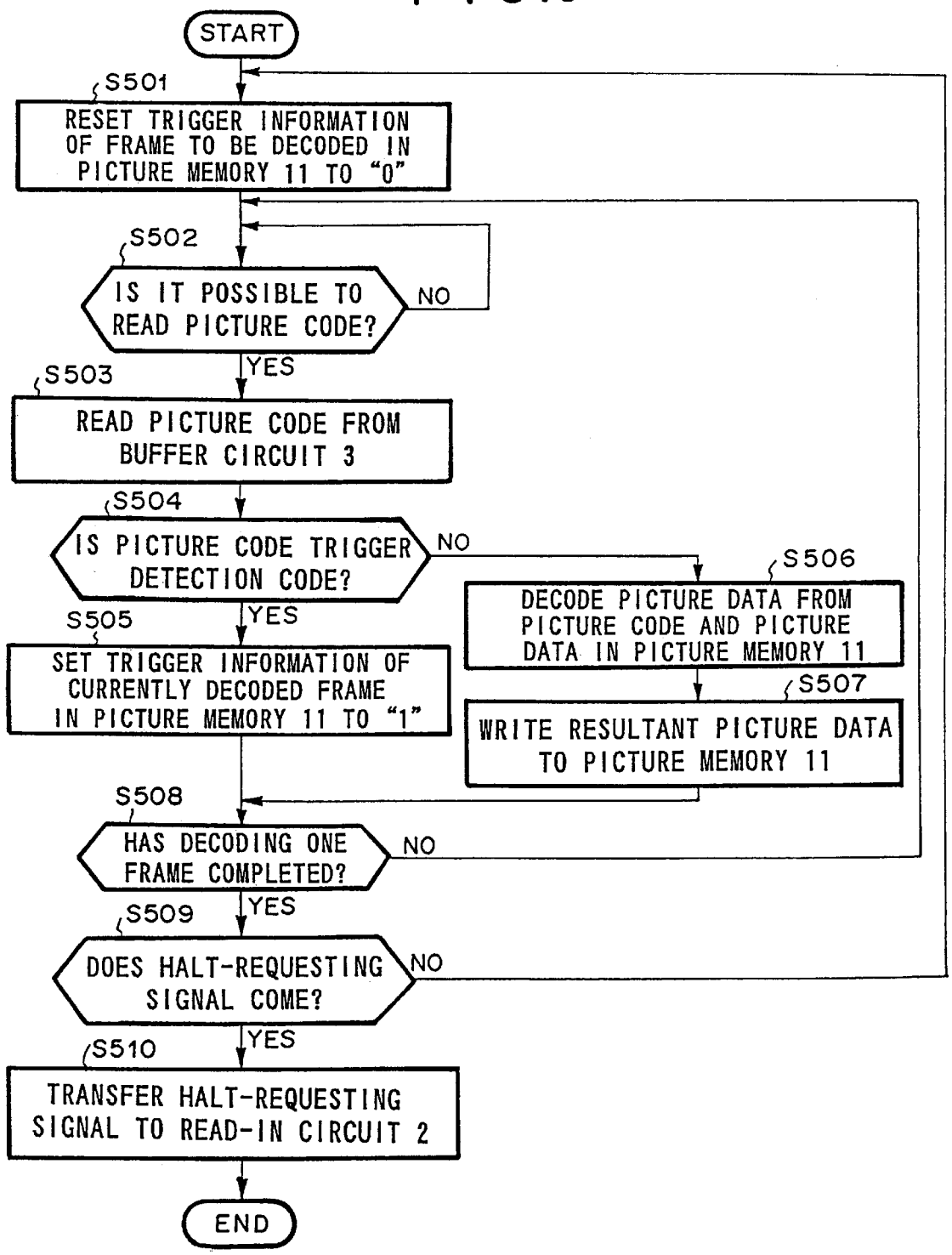
FIG. 5 is a flowchart showing the operation of core decoder 9.

As shown in FIG. 5, core decoder 9 monitors whether there is inserted a trigger detection code in picture codes from the beginning to the end of decoding one frame, and if core decoder 9 detects a trigger detection code, core decoder 9 sets trigger information of the frame in picture memory 11. Picture memory 11 holds the value of the trigger information. Therefore, transfer control circuit 10 can detect the trigger information in the invariable time sequence no matter which sector among sectors included in a frame which is desired to be displayed in a freeze mode by the automatic pause function has an active automatic pause trigger bit. Thus, no restriction is imposed as to which sector has an active automatic pause trigger bit among sectors included in a frame which is desired to be displayed in a freeze mode by the automatic pause function.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A picture-reproducing apparatus for reproducing a moving picture from picture codes recorded in a record medium having sectors, wherein picture codes and an automatic pause trigger bit are recorded in each of said sectors, said picture-reproducing apparatus comprising:

a read-in circuit for reading said picture codes and said automatic pause trigger bit from each of said sectors in accordance with a decode sequence;

code-inserting circuit for inserting a trigger detection code into said picture codes read by said read-in circuit if said automatic pause trigger bit read by said read-in circuit has an active value;

a buffer for temporally storing said picture codes read by said read-in circuit;

a decoder for reading said picture codes which have been temporally stored in said buffer, decoding picture data from said picture codes read from said buffer, and setting trigger information of each frame to an active value if said trigger detection code is inserted in the picture codes of respective frame or resetting said trigger information of each frame to an inactive value if said trigger detection code is not inserted in the picture codes of respective frame;

a picture memory for temporally storing said picture data and said trigger information while making a relationship between said picture data and said trigger information with respect to a frame;

a transfer control circuit for, in accordance with a display sequence, reading said picture data and said trigger information from said picture memory; and a display circuit for displaying a moving picture using said picture data read from said picture memory by said transfer control circuit;

wherein when said transfer control circuit detects that said trigger information read from said picture memory has an active value, said transfer control circuit halts reading operation thereof from a succeeding frame, output a halt-requesting signal to said read-in circuit in order to cause said read-in circuit to halt operation thereof, and output said halt-requesting signal to said decoder in order to cause said decoder to halt operation thereof; and wherein when said transfer control circuit halts reading operation thereof, said display circuit displays a frame before the halt in a freeze mode.

2. The picture-reproducing apparatus according to claim 1, wherein said halt-requesting signal is inputted to said read-in circuit through said decoder.

3. The picture-reproducing apparatus according to claim 1, wherein said read-in circuit halts operation thereof in sector unit when said read-in circuit is requested to halt operation thereof by said halt-requesting signal.

4. The picture-reproducing apparatus according to claim 1, wherein said decoder halts operation thereof in frame unit when said decoder is requested to halt operation thereof by said halt-requesting signal.

5. A picture-reproducing apparatus for reproducing a moving picture from picture codes recorded in a record medium having sectors, wherein picture codes and an automatic pause trigger bit are recorded in each of said sectors, said picture-reproducing apparatus comprising:

a read-in circuit for reading said picture codes and said automatic pause trigger bit from each of said sectors in accordance with a decode sequence;

code-inserting circuit for inserting a trigger detection code of an active value into said picture codes read by said read-in circuit if said automatic pause trigger bit read by said read-in circuit has an active value or inserting a trigger detection code of an inactive value into said picture codes read by said read-in circuit if said automatic pause trigger bit read by said read-in circuit has an inactive value;

a buffer for temporally storing said picture codes read by said read-in circuit;

a decoder for reading said picture codes which have been temporally stored in said buffer, decoding picture data from said picture codes read from said buffer, and setting trigger information of each frame to an active value if said trigger detection code of said active valve is inserted in the picture codes of respective frame or resetting said trigger information of each frame to an inactive value if said trigger detection code of said active value is not inserted in the picture codes of respective frame;

a picture memory for temporally storing said picture data and said trigger information while making a relationship between said picture data and said trigger information with respect to a frame;

a transfer control circuit for, in accordance with a display sequence, reading said picture data and said trigger information from said picture memory; and a display circuit for displaying a moving picture using said picture data read from said picture memory by said transfer control circuit;

wherein when said transfer control circuit detects that said trigger information read from said picture memory has an active value, said transfer control circuit halts reading operation thereof from a succeeding frame, output a halt-requesting signal to said read-in circuit in order to cause said read-in circuit to halt operation thereof, and output said halt-requesting signal to said decoder in order to cause said decoder to halt operation thereof; and wherein when said transfer control circuit halts reading operation thereof, said display circuit displays a frame before the halt in a freeze mode.

6. The picture-reproducing apparatus according to claim 5, wherein said halt-requesting signal is inputted to said read-in circuit through said decoder.

7. The picture-reproducing apparatus according to claim 5, wherein said read-in circuit halts operation thereof in sector unit when said read-in circuit is requested to halt operation thereof by said halt-requesting signal.

8. The picture-reproducing apparatus according to claim 5, wherein said decoder halts operation thereof in frame unit when said decoder is requested to halt operation thereof by said halt-requesting signal.

9. The picture-reproducing apparatus according to claim 5, wherein said trigger detection code is inserted in a fixed position in a series of said picture codes with respect to a start point of a frame.

10. A picture-reproducing method for reproducing a moving picture from picture codes recorded in a record medium having sectors, wherein picture codes and an automatic pause trigger bit are recorded in each of said sectors, said picture-reproducing method comprising:

a first step of reading said picture codes and said automatic pause trigger bit from each of said sectors in accordance with a decode sequence;

a second step of inserting a trigger detection code into said picture codes if said automatic pause trigger bit has an active value;

a third step of temporally storing said picture codes;

a fourth step of reading said picture codes which have been temporally stored, a fifth step of decoding picture data from said picture codes which have been read at said fourth step, a sixth step of setting trigger information of each frame to an active value if said trigger detection code is inserted in the picture codes of respective frame or resetting said trigger information of each frame to an inactive value if said trigger detection code is not inserted in the picture codes of respective frame;

a seventh step of temporally storing said picture data and said trigger information while making a relationship between said picture data and said trigger information with respect to a frame;

a eighth step of, in accordance with a display sequence, reading said picture data and said trigger information; and a ninth step of displaying a moving picture using said picture data;

wherein when it is detected at said eighth step that said trigger information has an active value, said eighth step is halted from a succeeding frame and said first step through said seventh steps are halted thereafter; and wherein when said eighth step is halted, a frame before the halt of said eighth step is displayed in a freeze mode at said ninth step.

11. The picture-reproducing method according to claim 10, wherein said first step is halted in sector unit when it is detected at said eighth step that said trigger information has an active value.

12. The picture-reproducing method according to claim 10, wherein said fourth step through said sixth steps are halted in frame unit when it is detected at said eighth step that said trigger information has an active value.

13. A picture-reproducing method for reproducing a moving picture from picture codes recorded in a record medium having sectors, wherein picture codes and an automatic pause trigger bit are recorded in each of said sectors, said picture-reproducing method comprising:

a first step of reading said picture codes and said automatic pause trigger bit from each of said sectors in accordance with a decode sequence;

a second step of inserting a trigger detection code of an active value into said picture codes if said automatic pause trigger bit has an active value or inserting a trigger detection code of an inactive value into said picture codes if said automatic pause trigger bit has an inactive value;

a third step of temporally storing said picture codes;

a fourth step of reading said picture codes which have been temporally stored, a fifth step of decoding picture data from said picture codes which have been read at said fourth step, a sixth step of setting trigger information of each frame to an active value if said trigger detection code of said active value is inserted in the picture codes of respective frame or resetting said trigger information of each frame to an inactive value if said trigger detection code of said active value is not inserted in the picture codes of respective frame;

a seventh step of temporally storing said picture data and said trigger information while making a relationship between said picture data and said trigger information with respect to a frame;

a eighth step of, in accordance with a display sequence, reading said picture data and said trigger information; and a ninth step of displaying a moving picture using said picture data;

wherein when it is detected at said eighth step that said trigger information has an active value, said eighth step is halted from a succeeding frame and said first step through said seventh steps are halted thereafter; and wherein when said eighth step is halted, a frame before the halt of said eighth step is displayed in a freeze mode at said ninth step.

14. The picture-reproducing method according to claim 13, wherein said first step is halted in sector unit when it is detected at said eighth step that said trigger information has an active value.

15. The picture-reproducing method according to claim 13, wherein said fourth step through said sixth steps are halted in frame unit when it is detected at said eighth step that said trigger information has an active value.

* * * * *